United States Patent [19]

Lawler

[11] Patent Number: 4,922,173

[45] Date of Patent: May 1, 1990

[54] MACHINE DRIVE SYSTEM

[75] Inventor: Anthony J. Lawler, Burgess Hill, England

[73] Assignee: The Kemble Instrument Company Limited, Burgess Hill, England

[21] Appl. No.: 248,791

[22] Filed: Sep. 23, 1988

[30] Foreign Application Priority Data

Sep. 25, 1987 [GB] United Kingdom ............... 8722575

[51] Int. Cl.$^5$ .............................................. B66C 23/16
[52] U.S. Cl. ................................. 318/568.2; 318/67; 364/513; 74/89.22
[58] Field of Search ..................... 318/568.2, 568.21, 5, 318/625, 9, 14, 560–638; 901/17, 21, 9, 12, 15, 17–23; 74/89.22, 89.2; 364/531; 414/744 R

[56] References Cited

U.S. PATENT DOCUMENTS

| | | | |
|---|---|---|---|
| 4,315,437 | 2/1982 | Etcheparpe et al. ............... | 74/89.22 |
| 4,507,044 | 3/1985 | Hutchins et al. .................. | 318/67 X |
| 4,524,520 | 6/1985 | Levy .................................... | 74/89.22 |
| 4,537,084 | 8/1985 | Passemard .......................... | 74/89.22 |
| 4,600,083 | 7/1986 | Parent et al. ....................... | 74/89.22 |
| 4,806,066 | 2/1989 | Rhodes et al. ..................... | 74/89.22 |

Primary Examiner—William M. Shoop, Jr.
Assistant Examiner—Paul Ip
Attorney, Agent, or Firm—Chilton, Alix & Van Kirk

[57] ABSTRACT

A drive system for a machine such as a robot providing motion in two independent directions under the control of respective motors, comprising a saddle supported for motion in a first said direction, an arm supported by said saddle for motion in the second said direction, a first belt drive arranged to transmit drive from a first of said motors to said saddle and a second belt drive arranged to transmit drive from the second of said motors to said arm, said second belt drive comprising a belt having two portions extending around respective pulleys mounted on the arm and arranged to be driven by the second motor such that one portion is lengthened and the other shortened when the first motor is stopped, so that the arm moves relative to the saddle, but when the first motor is driven and the second motor stopped said two portions remain the same length so that the arm does not move relative to the saddle as the saddle moves.

4 Claims, 10 Drawing Sheets

MACHINE DRIVE SYSTEM

This invention relates to a drive system for a machine which has a part movable to a desired position in two or three dimensions, such as a robot.

A simple and low-cost robot drive system may be provided by the use of cable or belt drive systems for transmitting drive from an electric motor to a movable part. Such a system is described in GBA-2123790 which discloses a cylindrical robot in which a table carrying a vertical support is rotatable about a vertical axis by a first motor, a carriage carried by the support is movable vertically by a second motor, and an arm carried by the carriage is movable horizontally by a third motor. The first, second and third motors drive the table, carriage and arm via respective cable drive arrangements, and suitable movement of the three motors provides desired three-dimensional movement of a working part carried by the arm. However, this arrangement suffers from the disadvantage that vertical movement of the carriage by the second motor will also result in horizontal movement of the arm, even with no movement of the third motor, and so additional compensating components have to be provided. Specifically, sensing means to sense the vertical and horizontal position of the robot arm are provided, together with a means to synchronize the operation of the vertical and horizontal motors so that when robot arm is caused to move vertically the motor controlling horizontal movement is also activated to compensate for the horizontal drift in the robot arm which would otherwise occur.

It is an object of the invention to provide a robot having a plurality of motors for the respective degrees of freedom of movement of the working part and with a belt drive system for transmitting drive from the respective motors such that motion of one motor does not cause motion in a direction associated with another motor, whereby a simple and reliable drive and control system can be provided.

As used herein the term 'belt' is intended to include any substantially inextensible, elongate, flexible tension element such as plain or toothed belts of any cross-section, cables, chains, ropes, etc.

According to the present invention there is provided a drive system for a machine providing independent translational motion in at least two different directions under the control of respective motor means, comprising a first carrier supported for motion in a first said direction, a second carrier supported by said first carrier for motion in the second said direction, a first drive arranged to transmit drive from a first of said motor means to said first carrier and a second drive arranged to transmit drive from the second of said motor means to said second carrier, said second drive comprising belt means having two portions each extending between points on the first and second carriers and arranged to be driven by the second motor means such that one portion is lengthened and the other shortened when the first motor means is stopped, so that the second carrier moves relative to the first carrier, but when the first motor means is driven and the second motor means stopped said two portions remain the same length so that the second carrier does not move relative to the first carrier as the first carrier moves.

Preferably said belt means comprises a belt of which said portions extend around respective pulleys mounted on the second carrier and also extend around respective pulleys mounted on the first carrier so as to be able to move the pulleys mounted on the second carrier towards and away from the pulleys mounted on the first carrier. Thus viewed from another aspect the invention provides a drive system for a machine providing motion in two independent directions under the control of respective motors, comprising a first carrier supported for motion in a first said direction, a second carrier supported by said first carrier for motion in the second said direction, a first belt drive arranged to transmit drive from a first of said motors to said first carrier and a second belt drive arranged to transmit drive from the second of said motors to said second carrier, said second belt drive comprising a belt having two portions extending around respective pulleys mounted on the second carrier and arranged to be driven by the second motor such that one portion is lengthened and the other shortened when the first motor is stopped, so that the second carrier moves relative to the first carrier, but when the first motor is driven and the second motor stopped said two portions remain the same length so that the second carrier does not move relative to the first carrier as the first carrier moves.

Preferably when the second motor drives and the first motor is stopped the belt is anchored at a point off the second carrier.

Viewed from another aspect, the invention provides a drive system for a machine providing independent translational motion in at least two different directions under the control of respective motor means, comprising a first carrier supported for motion in a first said direction, a second carrier supported by said first carrier for motion in the second said direction, a first drive arranged to transmit drive from a first of said motor means to said first carrier and a second drive arranged to transmit drive from the second of said motor means to said second carrier, said second drive comprising a belt having two portions extending around respective pulleys mounted on the second carrier and arranged to be driven by the second motor means such that one portion is lengthened and the other shortened when the first motor means is stopped, so that the second carrier moves relative to the first carrier, but when the first motor means is driven and the second motor means stopped said two portions remain the same length so that the second carrier does not move relative to the first carrier as the first carrier moves.

Figure 1:
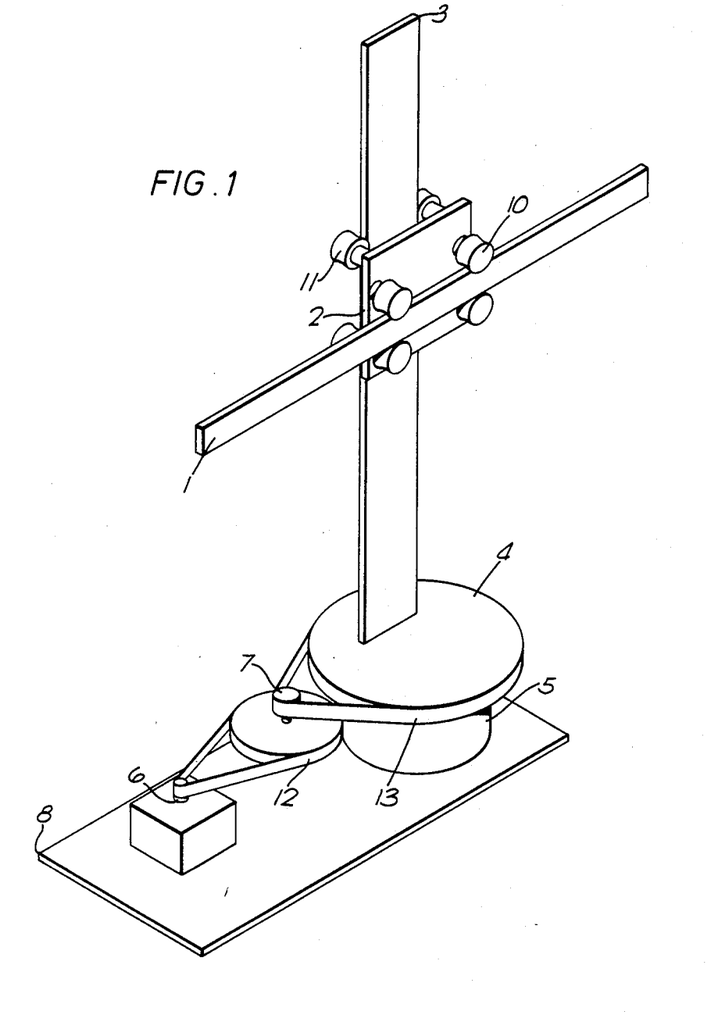
FIG. 1 is a perspective view illustrating the support components of a cylindrical robot according to the present invention.

A cylindrical robot apparatus with part of the drive system removed is shown in FIG. 1. It comprises a rotatable table 4 mounted on a base plate 8 via bearing 5 and carrying a vertical support member 3. A first carrier in the form of a vertically movable saddle 2 runs on member 3 via wheels 11, and further wheels 10 mounted on the saddle 2 support a second carrier in the form of an arm 1 for horizontal movement in a direction referred to herein as the Y direction. The arm 1 may be adapted at one end to carry one of a number of different tools, including sampling probes and mechanical grabs. Rotary motion of the table 4 is effected by a drive motor 6, which is connected via a belt 12 to a drive pulley 7, which in turn is connected to the table 4 via a belt 13. The drive pulley 7 consists of two wheels of different size which enable a reduced speed and increased torque to be transmitted to the table 4. Possible alternative arrangements to effect rotary motion of the table 4 include connecting the table directly to the spindle of a drive motor.

Figure 2:
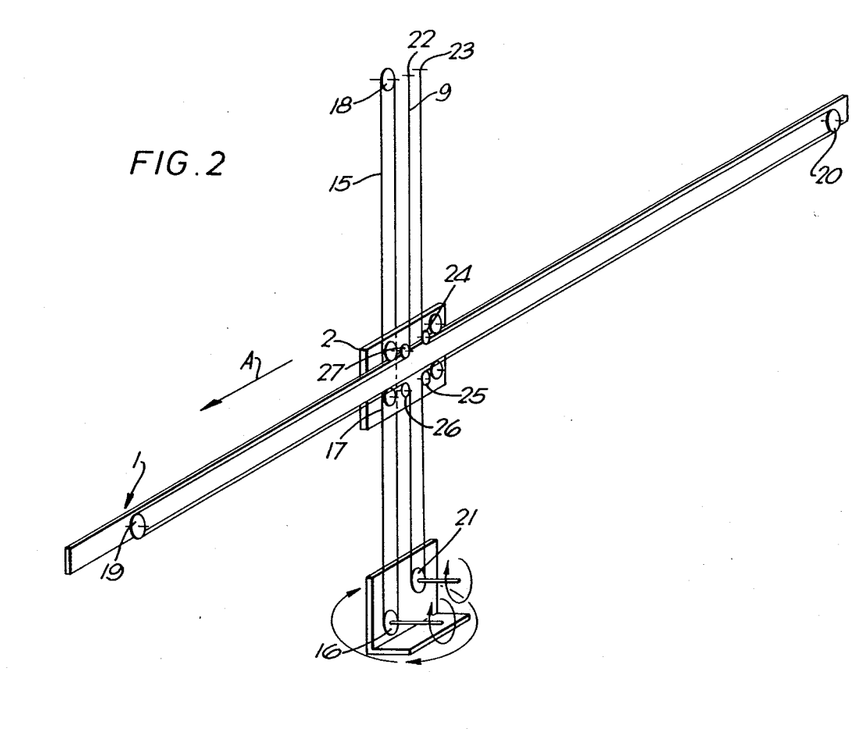
FIG. 2 is a schematic view of the cylindrical robot of FIG. 1 incorporating a drive system according to an embodiment of the present invention.

A schematic diagram of the belt drive system according to an embodiment of the invention is shown in FIG. 2. Motion of the saddle 2 in the vertical Z direction is effected by a conventional pulley and drive system. A belt 15 is fixedly attached to the saddle 2 (as shown by the dashed portion of the belt 15 passing through the saddle), passed around a vertical drive pulley 16, through a hole 17 extending through the body of the saddle, and around a vertical idler pulley 18 mounted on the vertical member 3 (not shown in FIG. 2). Rotational motion of the drive pulley 16 causes the saddle to move vertically.

The horizontal or radial drive system for the robot arm 1 consists of a belt 9, four idler pulleys 24–27 mounted on the saddle 2, two idler pulleys 19, 20 mounted near the two ends of the robot arm 1, and a radial drive pulley 21. The belt 9 is firmly fixed at two anchor points 22, 23 removed from the robot arm and saddle, for example on the vertical member 3. From point 23 the belt 9 passes around the saddle idler pulley 24, along the arm and around the idler pulley 20, back along the arm and around the saddle idler pulley 25, around the radial drive pulley 21, then upwardly to idler pulleys 26, 19, 27, to terminate at the anchor point 22. The belt 9 is caused to firmly grip the drive pulley 21. Clockwise rotation of the drive pulley 21 as shown in FIG. 2 results in the shortening of the length of the belt 9 in the portion that passes from the anchoring point 23 around the idler pulleys 24, 20, 25, and a corresponding lengthening of the portion of the belt passing around the idler pulleys 26, 19, 27, causing the robot arm to move horizontally in the direction indicated by the arrow A.

However, when the radial drive pulley 21 is not driven by its associated drive motor the belt 9 is not capable of movement relative to the drive pulley and hence the length of the belt in the two portions from the drive pulley to the anchoring points remains constant Therefore, if vertical motion of the saddle is caused to occur by the vertical drive pulley 16, the arm 1 will not move horizontally. Instead, the two portions of the belt run through the two sets of idler pulleys 24, 20, 25 and 27, 19, 26 as the saddle moves vertically. This is in contrast with other drive systems not using a belt anchored at a point off the arm, in which any vertical movement of the saddle results in corresponding horizontal motion of the arm.

Figure 3:
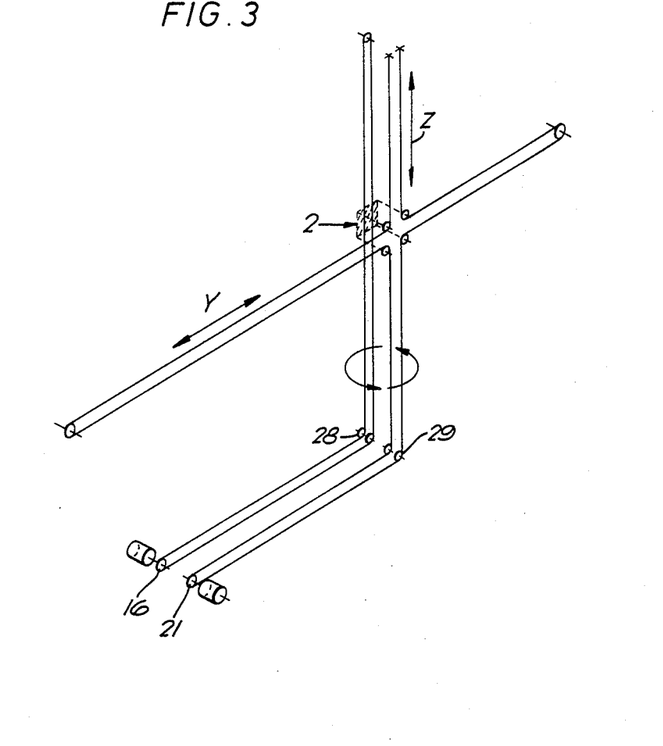
FIG. 3 is a schematic perspective view of an alternative embodiment of the drive system of the present invention for use with a cylindrical robot.

In FIG. 2 the vertical and horizontal drive pulleys 16 and 21 are shown as being mounted upon the movable table 4, and corresponding motors would be carried by the table 4. An alternative embodiment is shown in FIG. 3 in which the drive pulleys and motors are fixed at a point off the movable table, the belts passing around a series of pulleys 28, 29, mounted e.g. below the table, and thence upwardly through a suitable hole or holes in the movable table 4 (not shown). It is arranged that there is sufficient length between the idler pulleys 28, 29 and the saddle 2 in operation for the two belts to twist without significant shortening between these points. In practice it is possible to obtain a rotation of the table of up to 270° without tangling of the belts. In this way, the vertical and horizontal drive motors can be fixed to the chassis of the instrument and moving looms are not required for the motors. In addition, indicator flags may be attached to the belts between the drive pulleys 16, 21 and the idler pulleys 28, 29 to enable a predetermined position of the arm and saddle to be established without having to fix sensors directly to a moving part of the instrument.

In an alternative embodiment the drive pulleys 16, 21 may be mounted directly beneath the movable table, removing the need for the idler pulleys 28, 29.

In all embodiments the drive pulleys 16 and 21 may be driven directly from the spindle of a drive motor, or via gears or a belt torque transmission system of the kind shown in FIG. 1.

The drive system of the present invention is equally applicable to cartesian robots in which the arm moves along three perpendicular cartesian axes, as it is to cylindrical robots, and some examples are shown in FIGS. 4 to 10.

Figure 4:
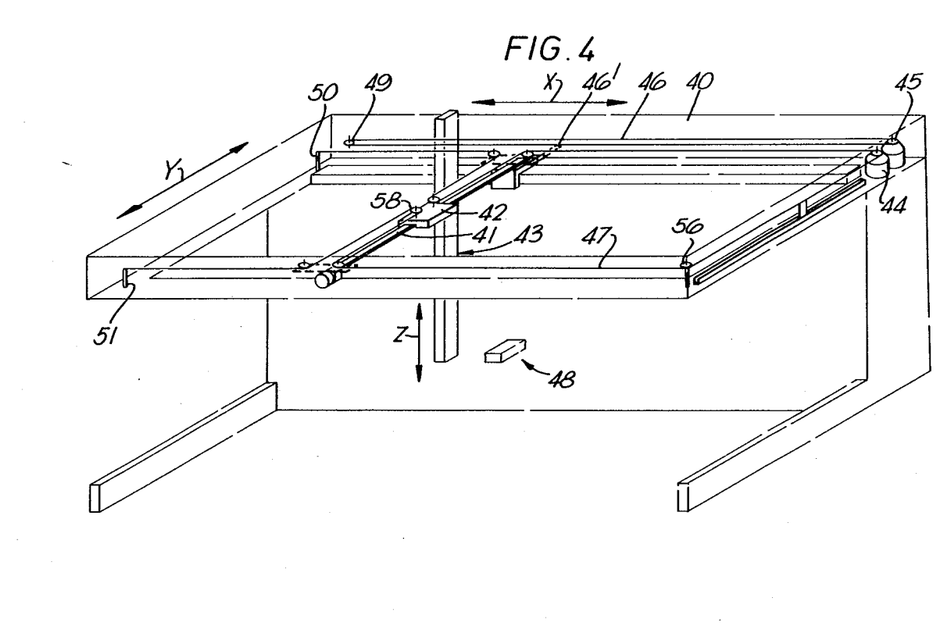
FIG. 4 is a perspective view of a cartesian robot incorporating a drive system according to an embodiment of the present invention.

The cartesian robot of FIG. 4 comprises a table 40, an elongate horizontal support member 41 which is movable in the horizontal X direction along slides at its ends, a saddle 42 which is movable along the member 41 in the horizontal Y direction, and an arm 43 which is movable with respect to the saddle in the vertical Z direction. Various tools and accessories, such as robotic hands, may be attached to the movable arm 43 as indicated at 48.

The horizontal member 41 is driven in the horizontal X direction by a conventional drive system analogous to the vertical drive system of the cylindrical robot, comprising a driver motor and pulley 45, a belt 46 fixed at one point 46' to the member 41, and an idler 49.

Figure 5:
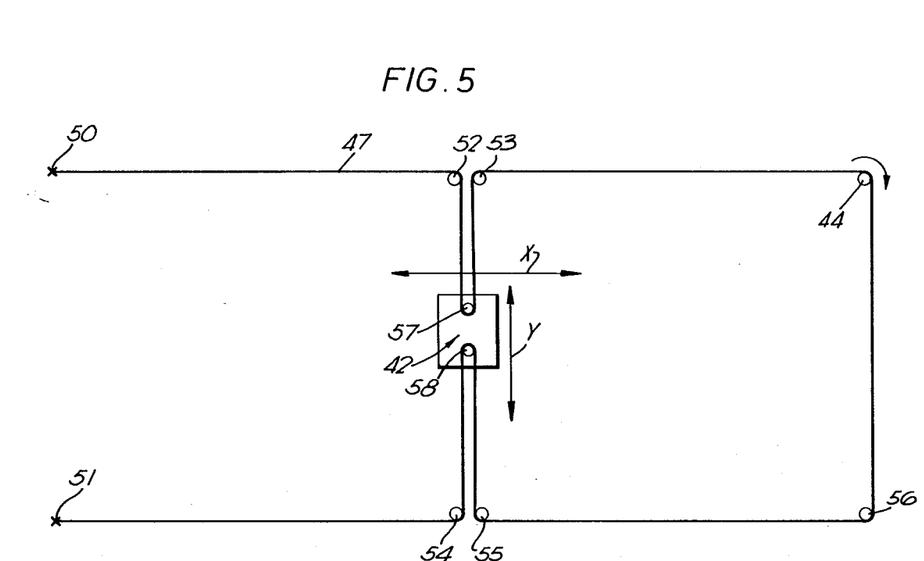
FIG. 5 is a plan view of the Y axis drive system of FIG. 4.

Referring also to FIG. 5, the horizontal Y direction drive system comprises a belt 47 fixed to the table 40 (not shown in FIG. 5) at points 50 and 51, a Y direction motor and drive pulley 44, a series of idler pulleys 52 to 55 mounted on the member 41 (not shown in FIG. 5), two idler pulleys 57, 58 mounted on the saddle 42, and an idler pulley 56 mounted on the table 40. The belt 47 runs from the fixed point 50 around the idler pulleys 52, 57, 53, around the drive pulley 44, around the idler pulley 56, then on to the idler pulleys 55, 58, 54 and the fixed point 51. If the drive pulley 44 turns in a clockwise direction as indicated, the portion of the belt between fixed point 50 and drive pulley 44 shortens, the portion of the belt between the drive pulley 44 and the fixed point 51 lengthens equally, and the saddle 42 holding the arm 41 moves in the horizontal Y direction towards the idler wheels 52, 53.

However, when the drive pulley 44 is not driven by its associated motor, the belt 47 is not capable of movement relative to the drive pulley 44. Therefore, if the member 41 upon which the idler wheels 52 to 55 are mounted is caused to move in the horizontal X direction by the X drive motor 45 and associated belt drive system there is no associated movement of the saddle in the Y direction, as the two portions of the belt between the Y drive motor 44 and the fixed points 50, 51 remain of a constant length. Instead, the two portions of the belt run through the idler wheels 52, 57, 53 and 54, 58, 55 respectively as the saddle 42 and member 41 move in the horizontal X direction.

Figure 6:
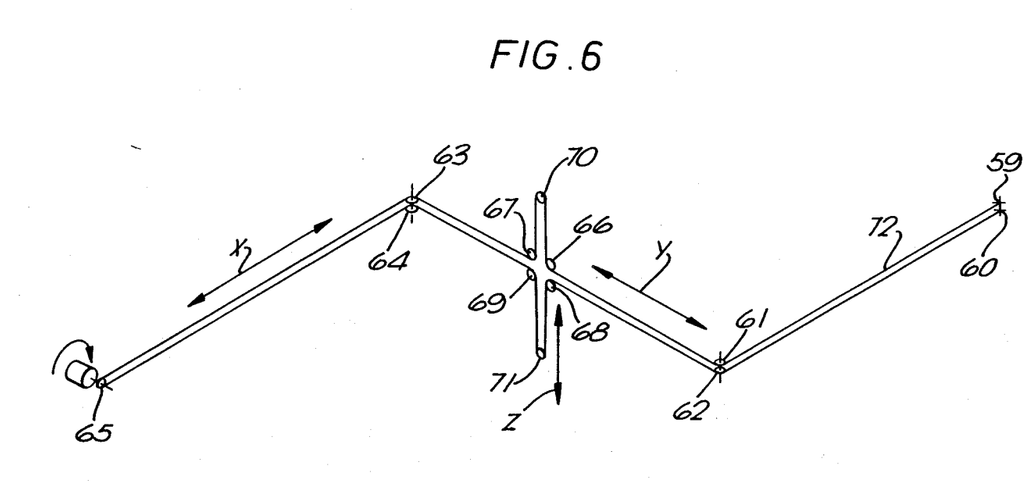
FIG. 6 is a schematic perspective view of a Z axis drive system according to an embodiment of the present invention for use with a cartesian robot.

FIG. 6 shows a belt drive system for providing vertical movement in the Z direction of the arm 43 of the cartesian robot of FIGS. 4 and 5 independently of movement in the X and Y directions. A belt 72 starts from a point 59 fixed to the table, passes around an idler pulley 61 attached to the horizontal member 41 (not shown in FIG. 6), twists through 90° to pass around an idler pulley 66 attached to the saddle 42 (not shown), passes over an idler pulley 70 attached to the arm 43 (not shown), around an idler pulley 67 attached to the saddle 42, twists through 90° to pass around an idler pulley 63 attached to the member 41, twists through a further 90° to pass around a drive pulley 65 attached to the spindle of a Z drive motor, and then returns to a point 60 fixed on the table 40, via idler pulleys 64, 62 attached to the member 41, idler pulleys 69, 68 attached to the saddle 42, and idler pulley 71 attached to the arm 43. If the Z drive pulley 65 rotates clockwise as shown, the portion of the belt between the drive pulley 65 and the fixed point 59 (via pulley 70 etc) lengthens, the portion of the belt between the motor 65 and fixed point 60 shortens, and the carriage 43 moves vertically upwards as the pulley 71 approaches the pulleys 68 and 69. Similarly, anti-clockwise rotation of the Z drive motor results in downwards movement of the arm.

If, however, the horizontal member 41 is caused to move in the horizontal X direction, there will be no corresponding motion in the vertical Z direction, as the portions of the belt between the motor 65 and fixed points 59 and 60 respectively will remain at a constant length and will run through the idler pulleys 61, 66, 70, 67, 63 and 62, 68, 71, 69, 64 respectively. Similarly, motion of the saddle 42 in the horizontal Y direction will not cause any motion of the arm in the Z direction, as the portions of the belt between the pulleys 61 and 63, and 62 and 64, will remain at constant length, and will run through the idler pulleys 66, 70, 67 and 68, 71, 69 respectively.

In order to save space, pulleys 66, 67 may be mounted on a common spindle vertically below pulley 70, such that the belt runs under pulley 67 up and anticlockwise around pulley 70 and back down around pulley 66. Similarly, pulleys 68, 69 may be mounted on a common spindle to save space.

Figure 7:
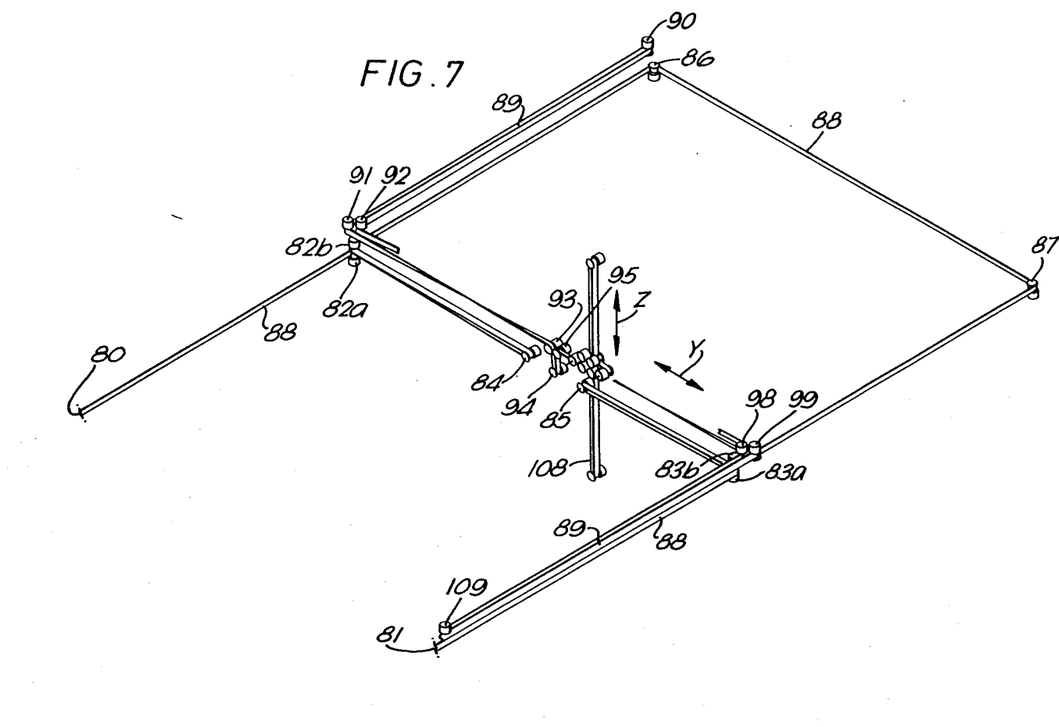
FIG. 7 shows alternative Z axis and Y axis drive systems according to an embodiment of the present invention for use with a cartesian robot.
Figure 8:
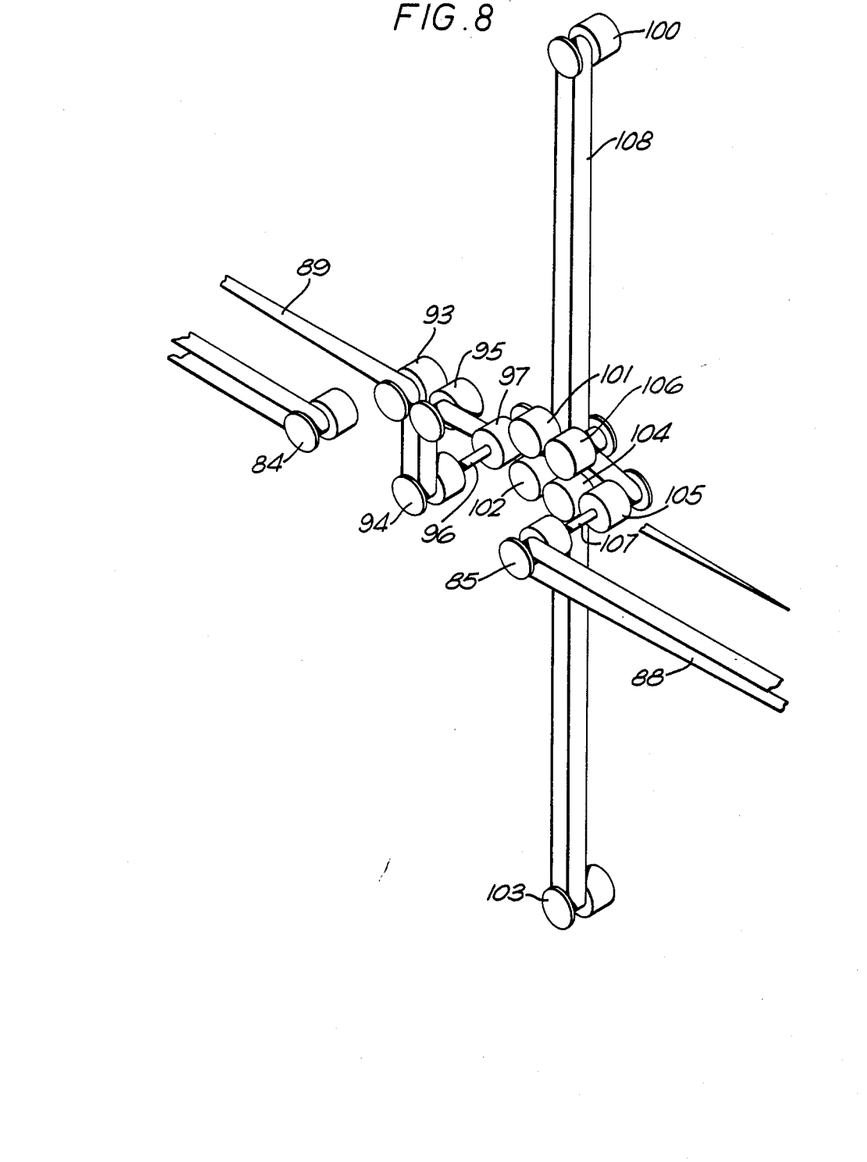
FIG. 8 shows in detail the idler pulleys associated with the drive systems of FIG. 7.

An alternative belt drive system applicable to the cartesian robot of FIG. 4 is shown in FIGS. 7 and 8.

A horizontal Y direction drive system for saddle 42 similar to that of FIG. 5 is shown, comprising a belt 88 fixed at two points 80, 81 on the table, driven by a drive pulley 86 also mounted on the table. The belt runs from fixed point 80, around a pulley 82a mounted on horizontal member 41, twists through 90° to pass around idler pulley 84 mounted on the saddle 42, returns along the member 41 to pass around pulley 82b, passes around the drive pulley 86 and then runs on to fixed point 81, via pulley 87 mounted on the table, pulleys 83b and 83a mounted on the horizontal member, and pulley 85 mounted on the saddle. A conventional X direction drive is also provided for moving the member 41 in the horizontal X direction.

The vertical Z direction drive system consists of two interacting belt systems including two continuous loop belts 89 and 108. Belt 89 loops around drive pulley 90, idler pulley 91 mounted on the horizontal member 41, idler pulleys 93, 94 and 95 mounted on the saddle 42, idler pulley 98 mounted on the member 41, idler pulley 109 mounted on the table and then back to drive pulley 90 via idler pulleys 99 and 92. Belt 108 runs from pulley 100 to pulley 103 both fixed to the arm 43 movable vertically with respect to the saddle, via pulleys 106, 105, 104 mounted on the saddle and returns from pulley 103 to pulley 100 via pulleys 102, 97, 101 mounted on the saddle. Pulley 94 is drivingly connected to pulley 97 via shaft 96 and pulleys 85 and 105 are connected by shaft 107.

When the horizontal X and Y drive systems are not in operation the belt 88 is not capable of movement around the idler pulleys of the Y drive system, and in particular pulley 85 is held against rotation. If the Z drive motor 90 is activated, the continuous belt 89 runs around the idler pulleys 91, 93-95 etc. Pulley 94 is rotated accordingly and this rotation is transmitted via shaft 96 to pulley 97 associated with the second belt system of belt 108. Pulley 105 of this belt system is connected via shaft 107 to pulley 85 of the horizontal Y drive system. If the horizontal Y drive system is not in operation and there is no horizontal movement of the saddle then pulley 85 will be held stationary by the belt 88, as will pulley 105. This will have the effect of holding the belt 108 at this point, and as the pulley 97 rotates, the two portions of the belt 108 running from rotating pulley 97 to stationary pulley 105 via pulleys 101, 100, 106 and 102, 103, 104 will one shorten and one lengthen according to the direction of rotation of the pulley 97, and the arm upon which the pulleys 100 and 103 are mounted will move up or down with respect to the saddle.

When the horizontal Y drive system is in operation and the Z drive system is not in operation, the belt 89 will run around the pulleys 93, 94, 95 as the saddle moves horizontally, causing rotation of pulley 97 of the arm belt system via shaft 96 accordingly. However, pulley 105 also rotates as the saddle moves horizontally, being driven by the pulley 85 of the Y drive system. The pulleys 94, 97, 85 and 105 are of such sizes (e.g. equal sizes) that the belt 108 is driven at the same speed by pulley 97 as it is by pulley 105, so the two portions of the belt 108 between pulley 97 and pulley 105 (one around pulley 100 and one around pulley 103) remain of constant length, as the belt 108 freely circulates around the system.

Similarly, when the member 41 moves in the X direction, the two portions of the belt 88 from motor 86 to anchoring points 80, 81 remain of constant length, the two portions of the belt 89 from the motor 90 round the pulleys 91, 92 to pulley 109 remain of constant length and the belt 108 rotates freely driven by pulleys 85, 94, and there is no movement of the saddle in the Y direction or of the arm in the Z direction.

Figure 9:
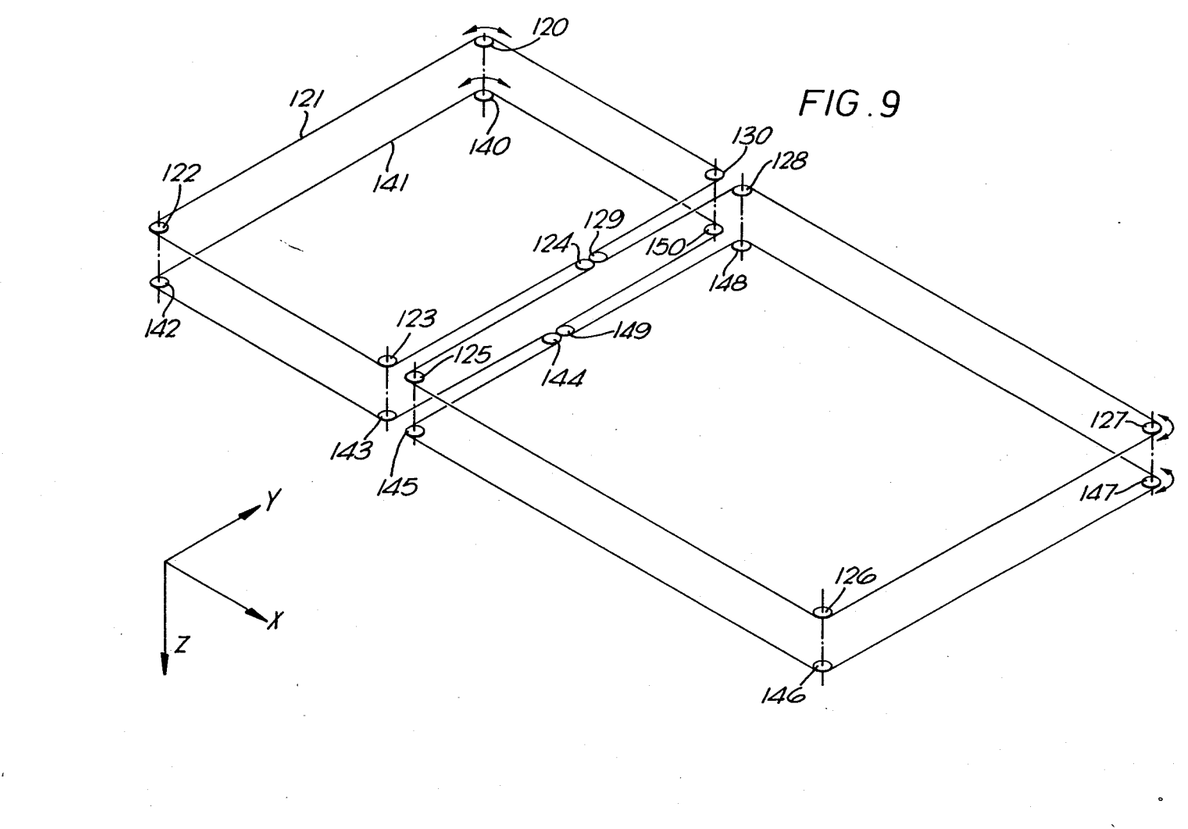
FIG. 9 shows a Y axis multiple drive system according to an embodiment of the present invention, suitable for example for a cartesian robot having a plurality of saddles mounted on a common member.

FIG. 9 shows a Y axis multiple drive system for driving in the Y axis a plurality of saddles mounted on a common member of a cartesian robot similar to that shown in FIG. 4. Although FIG. 9 shows a drive system for driving only two saddles, this system may be extended to a system having at least four saddles, depending on considerations of space and geometry. According to this aspect of the invention, each saddle may be moved substantially independently of the others so as to control the spacing between the saddles. Such a system is particularly applicable to a cartesian robot used in chemical research having a number of pipettes each mounted on Z axis arms, with each arm mounted on a separate saddle. The spacing of the saddles, and consequently the pipettes, can be varied to correspond to the spacing of the sample tubes from which or to which the liquid is pipetted. A drive system of this type may also be used to provide a gripping pincer by mounting on each saddle of a pair of saddles a vertically movable extending arm terminating in one half of a pincer. By controlling the spacing of the saddles the pincer can be used to grip, transport and release various objects as desired.

Each drive arrangement of the drive system in FIG. 9 includes a drive pulley 120, 140 for driving a continuous cable 121, 141 together with a back-off drive pulley 127, 147 capable of positively driving or stopping the continuous cable. The first drive arrangement for the first saddle (not shown) comprises the continuous cable 121 running from the drive pulley 120 around a series of idler pulleys 122, 126 mounted on the table, 123, 125, 128, 130 mounted on the member and 124, 129 mounted on the first saddle of a cartesian robot (not shown), and around the back-off drive pulley 127 also mounted on the table of the cartesian robot. The second drive arrangement for the second saddle (not shown) comprises a continuous cable 141 driven from a drive pulley 140 around a series of idler pulleys 142, 146 and 143, 145, 148, 150 and 144, 149 mounted respectively on the table, member and second saddle of the cartesian robot (not shown), together with the back-off drive pulley 147 also mounted on the table of the robot.

Drive pulleys 120, 140 are commonly driven from the same drive such that when back-off drive pulleys 127, 147 are switched off to hold the belts 121, 141 at these points, the first and second saddles (associated with idler pulleys 124, 129 and 144, 149 respectively) will be driven synchronously. However, the amount and direction of the drive supplied by each of the back-off drive pulleys 127, 147 may be varied independently of the other so as to independently control the motion of the first and second saddles to adjust the spacing thereof. For example, if drive pulleys 120, 140 and back-off drive pulley 127 are driven anticlockwise at the same speed while back-off drive pulley 147 is switched off to hold the cable at this point, then the first saddle of the robot would remain stationary, while the second saddle would move in the Y direction towards the first saddle, so as to narrow the gap between them. Back-off drive pulleys 127, 147 may also be driven opposite to each other or in the same direction in order to vary the spacing between the first and second saddles and the position on the member of the first and second saddles.

Movement in the X direction of the member of the robot can be accommodated without causing motion of the saddles in the Y direction by allowing the cables 121, 141 to run freely around the idler pulleys 123 to 125, 128 to 130 and 143 to 145, 148 to 150.

As mentioned above, pulleys 120, 140 are driven together. They may thus be replaced by a single pulley, as may pulleys 130, 150 and 122, 142 and 123, 143.

Figure 10:
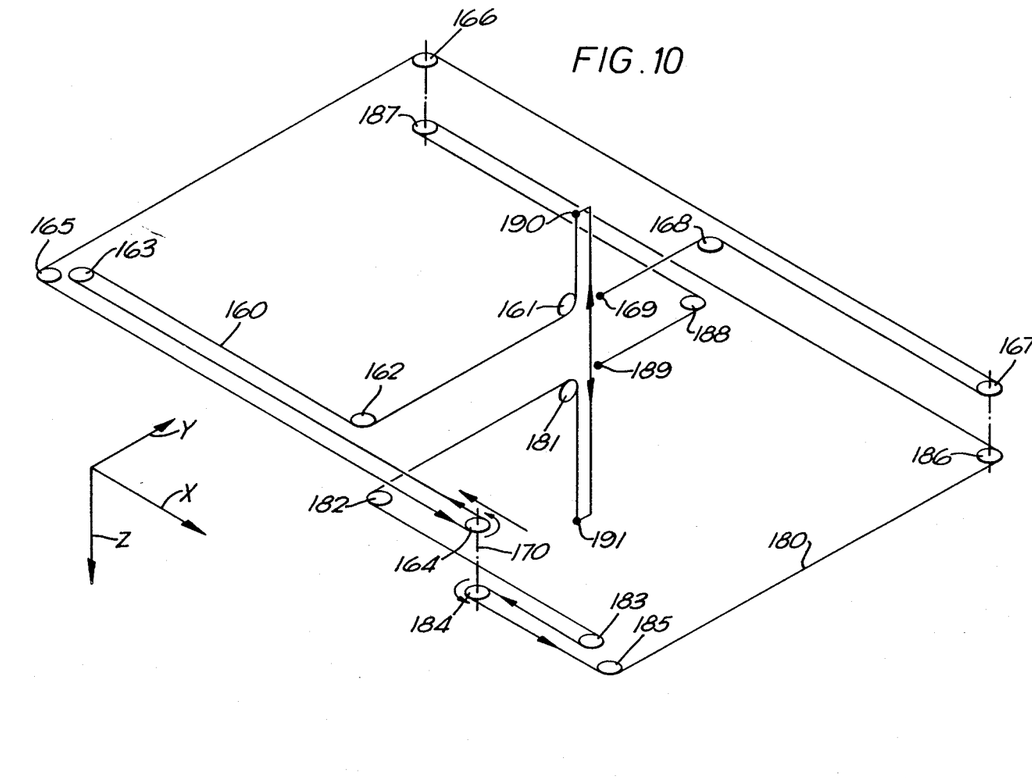
FIG. 10 shows a Z axis drive system for a cartesian robot, particularly of the kind having a plurality of saddles.

A Z axis drive system for an arm of a cartesian robot particularly suitable in combination with the Y axis drive system of FIG. 9 is shown in FIG. 10. This drive system particularly differs from the other drive systems previously described in that motion of the arm is effected by horizontal motion in the X direction of a spindle 170 on which are mounted idler wheels 164, 184 around which cables 160, 180 of an upper and lower cable arrangement run.

Upper cable 160 runs from a fixed point 190 substantially near the top of the robot arm, around idler pulleys 161, 162, 163 mounted on the saddle, member, and frame of the robot respectively, around idler pulley 164 mounted on the spindle 170 movable in the X direction, then around idler pulleys 165 to 167 and idler pulley 168, mounted on the frame and member respectively, to finally terminate at a fixed point 169 on the saddle. The lower cable 180 follows a similar path from a fixed point 191 substantially near the bottom of the robot arm around pulleys 181, 182, 183 mounted on the saddle, member and frame respectively around idler pulley 184 mounted on movable spindle 170 and then around idler pulleys 185 to 187 and idler pulley 188 mounted on the frame and member respectively to terminate at a fixed point 189 on the saddle.

Movement of spindle 170 in the direction shown by the arrow away from idler pulley 185 causes the arm to move upwardly as will be described. Due to cable 180 being fixed at 189 on the saddle, moving the idler pulley 184 in the direction shown causes the length of cable from pulley 184 to fixed point 189 to be lengthened, while simultaneously shortening the length of cable from fixed point 191 to idler pulley 184 causing the lower end of the arm to be moved towards pulley 181 mounted on the saddle. Similarly, movement of the pulley 164 in the direction shown causes the cable length from pulley 164 to fixed point 169 to be shortened, while allowing the cable run from pulley 164 to fixed point 190 to be lengthened, allowing movement of the top part of the arm away from the pulley 161 mounted on the saddle.

Similarly, moving the spindle 170 towards the pulley 185, opposite to the direction of the arrow, causes the arm to be lowered. The lateral motion of the spindle in the X direction may be effected by connecting the spindle 170 to a point on a continuous drive belt loop (not shown) running the length of the table.

Motion of the saddle in the Y direction can be accommodated without causing motion of the arm in the Z direction as the idler wheels 162 to 168 and 182 to 188 enable the upper and lower cables 160, 180 to run freely around the drive system without altering the length of cable between pulley 161 and fixed point 190 and pulley 181 and fixed point 191 respectively. Horizontal motion of the member in the X direction is similarly accommodated by allowing free motion of the upper and lower cables 160, 180 around the idler pulleys 163 to 167 and 183 to 187 respectively.

Thus it may be seen that in each embodiment described the invention provides a robot belt drive system in which a plurality of drive means provide drive in respective directions and each drive means provides motion in only one direction with the other drive means stopped.

I claim:

1. A drive system for a machine which provides independent translational motion in at least two different directions comprising:

a first carrier supported for motion in a first of said directions;

two second carriers supported by said first carrier for motion in the second of said directions;

first motor means;

first drive means for transmitting power from said first motor means to said first carrier;

second motor means; and two second drive means for transmitting power from said second motor means to said second carriers, each of said second drive means comprising a belt having two portions, each of said belt portions extending between points on the first carrier and on a respective second carrier, each said belts being arranged to be driven by said second motor means such that one portion thereof may be lengthened and the other shortened when said first motor means is stopped so that the respective second carrier moves relative to the said first carrier, but when said first motor means is driven and said second motor means is stopped said two belt portions remain the same length so that the respective second carrier does not move relative to said first carrier as said first carrier moves;

said second motor means comprising a single second motor and at least a first additional motor, said single second motor driving both said second drive means belts whereby said second carriers move together relative to said first carrier, at least one of said second drive means also being driven by said first additional motor of said second motor means to enable variable drive to be provided to its belt so as to enable relative motion between said second carriers.

2. The drive system as claimed in claim 1 wherein said portions of each said belt extend around respective pulleys mounted on a respective second carrier and also extend around respective pulleys mounted on the first carrier so as to be able to move the pulleys mounted on the second carrier towards and away from the pulleys mounted on the first carrier.

3. A drive system as claimed in claim 1 further comprising:

a third carrier supported by said second carriers for motion in a third direction;

third motor means; and third drive means for transmitting power from said third motor means to said third carrier, said third drive means comprising first and second belts, each of said belts of said third drive means having first and second portions extending from said third motor means to terminate on said second and third carriers respectively, the second portions of said third drive means first and second belts being lengthened and shortened respectively when the third motor means is driven so that the third carrier moves relative to the second carriers, but when said first or second motor means is driven and said third motor means is stopped the first portions of each belt of said third drive means are equally lengthened and the second portions of each belt of said third drive means are equally shortened so that the third carrier does not move relative to said second carriers as said second carriers move.

4. A drive system for a machine providing independent translational motion in at least two different directions under the control of respective motor means comprising:

a first carrier supported for motion in a first of said directions;

a second carrier supported by the said first carrier for motion in the second of said directions;

first motor means;

a first drive arranged to transmit drive power from said first motor means to said first carrier;

second motor means; and second drive means arranged to transmit drive power from said second motor means to said second carrier, said second drive means comprising first and second belts, each of said belts having first and second portions extending from said second motor means to terminate respectively on said first and second carriers such that the second portions of said first and second belts are lengthened and shortened respectively when said second motor means is driven so that said second carrier moves relative to said first carrier, but when said first motor means is driven and said second motor means stopped the said first portions of each said belt are equally lengthened and the said second portions of each said belt are equally shortened so that said second carrier does not move relative to said first carrier as said first carrier moves.

* * * * *